(12) United States Patent
Keuk et al.

(10) Patent No.: US 8,859,710 B2
(45) Date of Patent: Oct. 14, 2014

(54) POLYSILOXANE MODIFIED POLYISOCYANATES FOR USE IN COATINGS

(71) Applicant: Jones-Blair Company, Dallas, TX (US)

(72) Inventors: Jasmine Keuk, Rowlett, TX (US); Chiew W. Koay, Richardson, TX (US); Douglas E. Johnston, Fort Worth, TX (US); Carolina A. Flanigan, Mesquite, TX (US); Larry Dale Wyman, Dallas, TX (US); Roland L. Gasmena, Carrollton, TX (US); Paul Anthony Lum, Irving, TX (US)

(73) Assignee: Jones-Blair Company, Dallas, TX (US)

( * ) Notice: Subject to any disclaimer, the term of this patent is extended or adjusted under 35 U.S.C. 154(b) by 55 days.

(21) Appl. No.: 13/839,240

(22) Filed: Mar. 15, 2013

(65) Prior Publication Data

US 2014/0275410 A1    Sep. 18, 2014

(51) Int. Cl.
| | |
|---|---|
| *C08G 77/22* | (2006.01) |
| *C08G 77/26* | (2006.01) |
| *C08G 77/38* | (2006.01) |
| *C08G 77/388* | (2006.01) |
| *C08G 18/06* | (2006.01) |
| *C09D 175/14* | (2006.01) |

(52) U.S. Cl.
CPC ............ *C08G 77/388* (2013.01); *C09D 175/14* (2013.01)
USPC ................................ 528/25; 528/44; 525/474

(58) Field of Classification Search
CPC ........ C08G 77/04; C08G 77/22; C08G 77/26; C08G 77/38; C08G 77/388; C08G 18/06
See application file for complete search history.

(56) References Cited

U.S. PATENT DOCUMENTS

| | | | |
|---|---|---|---|
| 3,381,019 A | 4/1968 | Morehouse | |
| 4,002,794 A | 1/1977 | Schwarcz | |
| 4,435,587 A | 3/1984 | Sugiyama et al. | |
| 4,590,224 A | 5/1986 | Frisch, Jr. | |
| 4,684,538 A | 8/1987 | Klemarczyk | |
| 4,794,154 A * | 12/1988 | Benefiel | 528/45 |
| 5,284,919 A | 2/1994 | Nakai et al. | |
| 5,412,132 A | 5/1995 | Lucarelli et al. | |

(Continued)

FOREIGN PATENT DOCUMENTS

| | | |
|---|---|---|
| CN | 012134387 A | 12/2010 |
| EP | 0362145 | 4/1990 |
| WO | WO 2012/051135 A1 | 4/2012 |

OTHER PUBLICATIONS

Ni, et al., Preparation and characterization of alkoxysilane functionalized isocyanurates,Elsevier, Polymer, 2000, USA.

(Continued)

*Primary Examiner* — Robert S Loewe
(74) *Attorney, Agent, or Firm* — Locke Lord LLP

(57) ABSTRACT

The invention relates to an isocyanate-terminated polysiloxane material that can preferably be used as a curing agent, hardener or co-reactant in coatings. The invention further relates to a method of manufacturing the isocyanate-terminated polysiloxane material by partially hydrolyzing a methoxy-functional polysiloxane such as a methyl phenyl polysiloxane, and reacting it with a polyisocyanate to yield the isocyanate-terminated polysiloxane hardener. The hardener can preferably be used with any isocyanate-reactive functional group of another component to form coating systems, including acrylics, polyesters, epoxies and urethanes.

35 Claims, 8 Drawing Sheets

(56) References Cited

U.S. PATENT DOCUMENTS

| | | | |
|---|---|---|---|
| 5,574,122 | A | 11/1996 | Yeske et al. |
| 5,760,155 | A | 6/1998 | Mowrer et al. |
| 5,820,491 | A | 10/1998 | Hatch et al. |
| 6,352,768 | B1 | 3/2002 | Hseih et al. |
| 6,451,438 | B1 | 9/2002 | Chiang et al. |
| 6,545,104 | B1 | 4/2003 | Mueller et al. |
| 7,799,434 | B2 | 9/2010 | Webster et al. |
| 2004/0181008 | A1* | 9/2004 | Hanazawa et al. ............ 524/589 |
| 2009/0124766 | A1 | 5/2009 | Nennemann et al. |
| 2010/0044615 | A1* | 2/2010 | Lange et al. ................. 252/8.63 |
| 2010/0063238 | A1 | 3/2010 | Zhang et al. |
| 2010/0092766 | A1 | 4/2010 | Stine et al. |
| 2010/0127219 | A1 | 5/2010 | Mohamed |
| 2010/0280148 | A1 | 11/2010 | Webster et al. |
| 2010/0286426 | A1 | 11/2010 | Cremer |
| 2011/0118406 | A1 | 5/2011 | Mowrer et al. |
| 2011/0178225 | A1 | 7/2011 | Kudo et al. |

OTHER PUBLICATIONS

Ni, et al., Polyurea/polysiloxane ceramer coatings, Elsevier, Progress in Organic Coatings, 2000, USA.

Jiang et al., Synthesis of a New Polysiloxane Modified Polyurethane, Chinese Chemical Letters vol. 17, No. 5, pp. 581-583, 2006, www.imm.ac.cn/journal/ccl.html.

* cited by examiner

POLYSILOXANE MODIFIED POLYISOCYANATES FOR USE IN COATINGS

BACKGROUND

1. Field of the Invention

This invention generally relates to an isocyanate-terminated polysiloxane material and more particularly to an isocyanate-terminated polysiloxane material for use as a curing agent, hardener or co-reactant in coatings.

2. Description of Related Art

A typical two-component polyurethane system consists of an isocyanate-reactive polymer and an isocyanate or polyisocyanate. "Two-component" (also known as 2K) simply describes a paint system that is composed of a base paint and a hardener both of which are packaged separately. Before application of the paint, the base paint is mixed with the hardener in a predetermined ratio to initiate a chemical reaction. This paint mixture remains usable for a period of time known as pot life which varies depending on the formulation. The chemical reaction proceeds until gelation finally occurs. A two-component polyurethane, for example, may be composed of a polyol as the base and a polyisocyanate as the hardener.

Polysiloxanes have found their way into many areas including medical and non-medical fields. Medical applications of polysiloxanes include prostheses, artificial organs, facial reconstruction, catheters, artificial skin, contact lenses, and drug delivery systems. Non-medical applications include high-performance elastomers, membranes, electrical insulators, water repellants, anti-foaming agents, mold release agents, adhesives and protective coatings, release control agents for agricultural chemicals, and hydraulic, heat-transfer, and dielectric fluids. The use of polysiloxanes in coatings is increasing due to their ability to impart desirable characteristics such as improved chemical resistance, improved weatherability, improved flexibility, increased hydrophobicity and greater permeability to gases (while remaining impermeable to particles) compared to other polymers. In addition, polysiloxanes have lower surface energy (i.e. lower surface tension) and can therefore, provide higher slip properties and greater wettability which is why silicones have been primarily used as coating additives. This can bring lower viscosities in coatings and reduce the need for solvents which will lower the volatile organic content (VOC) of the coating system. However, alone polysiloxanes do not produce a desirable coating as they are very brittle.

BRIEF DESCRIPTION OF THE INVENTION

It has been discovered that polysiloxanes can be beneficially incorporated into isocyanate to produce a isocyanate-terminated polysiloxane material that retains the isocyanate functionality. The resulting isocyanate-terminated polysiloxane can preferably be used as a hardener for a two-component polyurethane system by further reacting it with an isocyanate-reactive polymer, such as a polyol. This preferably allows the beneficial incorporation of polysiloxanes into traditional coating systems such as acrylics, polyesters, epoxies and urethanes has allowed for the strengths of both inorganic and organic coatings to harmoniously produce a useable and robust coating.

In another aspect of the invention, the preferred isocyanate-terminated polysiloxane material can be preferably formed by partially hydrolyzing a methoxy-functional methyl phenyl polysiloxane resin to form a silanol functional resin and then reacted with a polyisocyanate to yield an isocyanate-terminated polysiloxane hardener where one of the NCO groups is reacted with the OH group that is directly bonded to a silicon. The isocyanate-terminated polysiloxane hardener contains at least one but more preferably two isocyanate groups that can react with an isocyanate-reactive functional group of a third component.

BRIEF DESCRIPTION OF FIGURES

For a more complete understanding of the present invention and for further advantages thereof, reference is now made to the following description taken in conjunction with the accompanying drawings in which.

DESCRIPTION OF THE PREFERRED EMBODIMENTS

Figure 1:
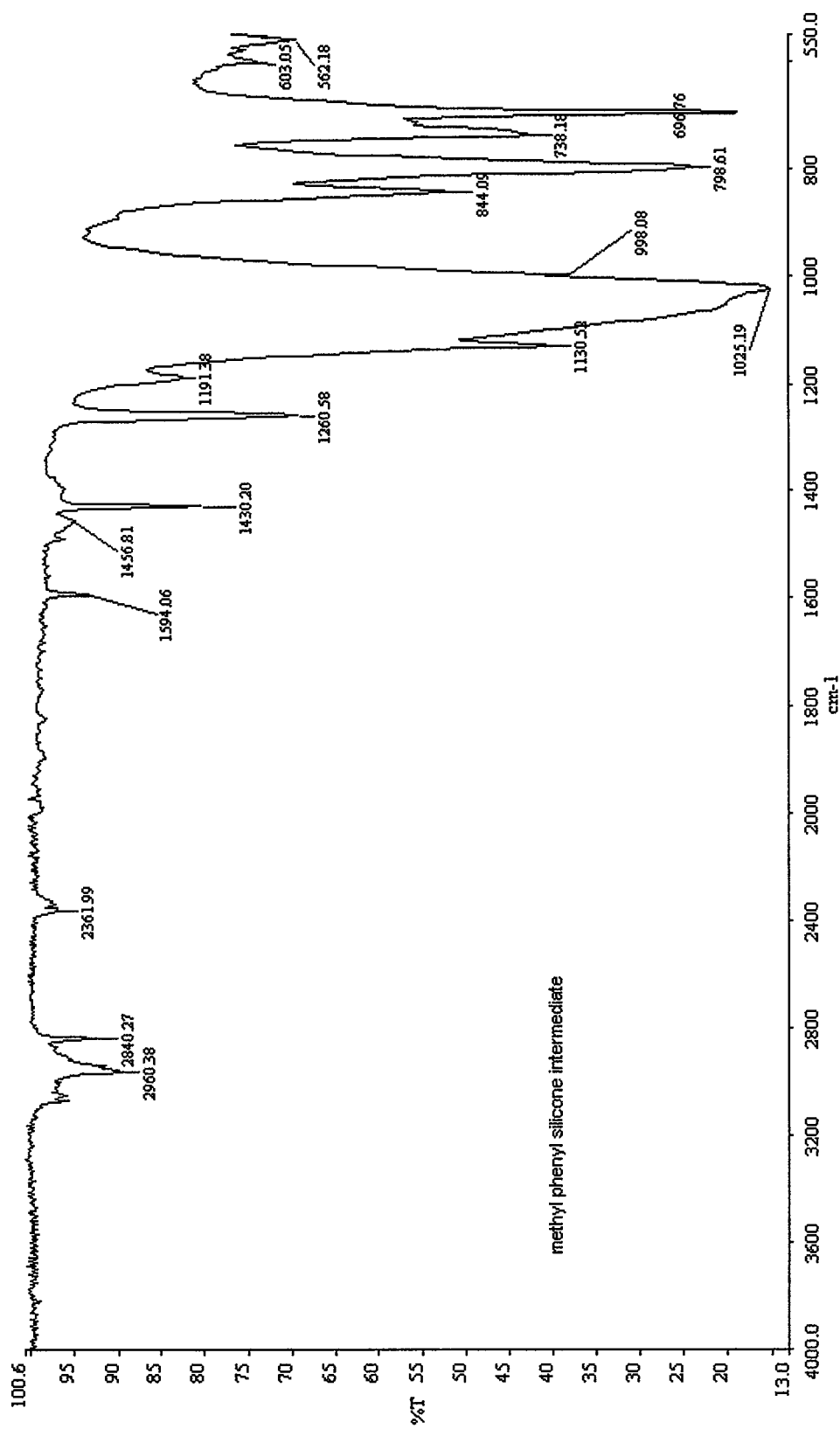
FIG. 1 is a graph of a FTIR analysis of an unaltered methyl phenyl polysiloxane intermediate resin from Example 1 showing the percent transmittance on the ordinate axis and the wavelength in $cm^{-1}$ on the abscissa axis.

The present invention can be better understood by the following discussion of the manufacture and use of certain preferred embodiments. All data disclosed below regarding time, temperature, amount of components, concentration in % by weight, etc. are to be interpreted as also including all values lying in the range of the respective measuring accuracy known to the person skilled in the art. Unless otherwise stated, technical grades of the various materials were used in the preferred embodiments.

The invention will be described in connection with addition of polysiloxane compound to an acrylic polyester polyurethane system. Specifically, the silanol functional polysiloxane is reacted with preferably one of the isocyanate groups of a polyisocyanate to form a polyisocyanate-terminated siloxane hardener. This hardener will then be reacted with a hydroxylated resin. For example, the polyisocyanate-terminated siloxane hardener can be reacted with an acrylic polyol to form an acrylic polyester polysiloxane coating. However, one of skill in the art will recognize that the invention can be used to form other isocyanate-terminated siloxane hardeners and can be used on other isocyanate-reactive polymers, such as acrylics, polyesters, epoxies and urethanes, to form coatings and other materials.

Preferably, the silanol functional polysiloxane resin is formed by partially hydrolyzing a methoxy-functional methyl phenyl polysiloxane resin. The resulting silanol functional polysiloxane resin is then reacted with a polyisocyanate to yield an isocyanate-terminated polysiloxane hardener where one of the NCO groups is reacted with the OH group that is directly bonded to a silicon. The isocyanate-terminated polysiloxane hardener contains at least one but more preferably two isocyanate groups that can react with an isocyanate-reactive functional group of a third component.

The polyisocyanate-terminated siloxane compound is preferably formed using the following reaction of a silanol functional polysiloxane resin, shown as compound 1, where n≥1, $R^1$, $R^2$ and $R^3$ individually represents the same or different methyl, phenyl or alkyl group and $R^4$ represents any cycloaliphatic or aromatic isocyanate trimer or adduct based on hexamethylene diisocyanate (HDI), isophorone diisocyanate (IPDI), diphenylmethane diisocyanate (MDI) and toluene diisocyanate (TDI). The polysiloxane resin is reacted with a polyisocyanate shown as compound 2 to form the polyisocyanate-terminated siloxane compound, shown as compound 3. This polyisocyanate-terminated siloxane compound can then be reacted with a, isocyanate-reactive polymer, such as a hydroxylated resin, to form a two-component polyurethane.

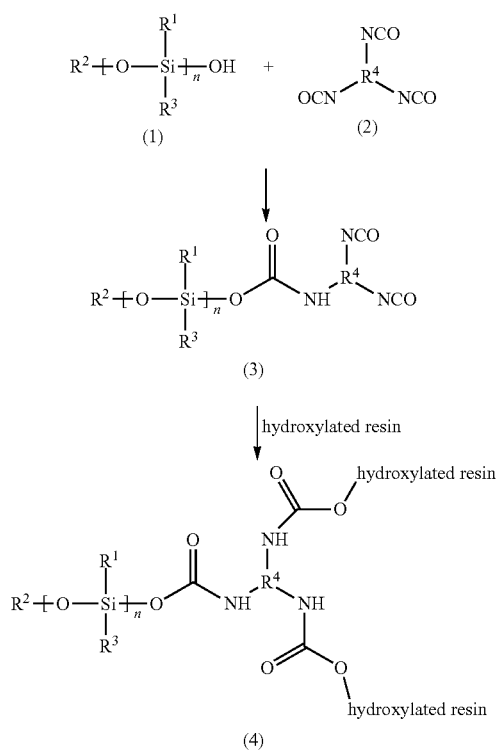

The preferred silicone resin is a methoxy-functional methyl phenyl polysiloxane intermediate Wacker Chemie AG SY 231 (also available as Xiameter RSN3074) (MW1000-1500). Xiameter is a registered trademark of and is available from Dow Corning of Midland, Mich. It is preferred due to its low viscosity (100-150 cps) and 1:1 methyl to phenyl group ratio and 0-20% alkoxy functionality. Other preferred intermediates include Silres IC 232 (alkoxy content 0-20%), Silres IC 368 (alkoxy content 0-20%) and Silres IC 836 (MW 1200-1500). Silres is a registered trademark of and available from Wacker Chemie AG of Munich, Germany. Additional silicone resins that are available from Dow Corning include RSN0217 (MW 1500-2500), RSN0220 (MW 2000-4000), RSN0233 (MW 2000-4000), RSN0249 (MW 2000-4000), RSN0255 (MW 2500-4500), RSN0409 (MW 2000-7000), RSN0431 (MW 2000-7000), RSN0804 (MW 2000-7000), RSN0805 (MW 200,000-300,000), RSN0806 (MW 200,000-300,000), RSN0808 (MW 200,000-300,000), RSN0840 (MW 2000-7000), RSN6018 (MW 1500-2500) (also known as Dow Corning® Z-6018) and RSN5314 (alkoxy content 30-40%) and other open-chained, cyclic or branched polysiloxanes and chlorosilanes.

The methoxy-functional methyl phenyl silicone intermediate is partially hydrolyzed. "Partially hydrolyzed" refers to 5-80% of the hydrolysable groups of the silicone intermediate (i.e. methoxy groups) are converted to hydroxyl groups. The preferred catalyst for this reaction is tetra isopropyl titanate and it is used at 0.01-1.0% weight of the silicone intermediate. The reaction is brought up to an initial temperature of 150° F. and then ramped up 10° F. every 10-15 minutes to a final temperature of 210±5° F. The reaction is held at this temperature until the predetermined amount of evolved methanol is collected. The amount of methanol (mols) expected is equivalent to the mols of water added to complete the hydrolysis. Preferably, this reaction is carried out without solvent. One equivalent of these hydroxyl groups is then reacted with three equivalents of isocyanate groups under a nitrogen atmosphere at a temperature of 130-195° F. for about one hour. The remaining available isocyanate groups are reacted with a hydroxylated resin or polyol. They can also react with amine-functional resins and resins containing the above mentioned functional groups and isocyanate-reactive species identified in paragraph 15.

The preferred catalyst for the hydrolyzation of the methyl phenyl silicone intermediate is tetra isopropyl titanate (Sigma Aldrich of St. Louis, Mo.; VWR of Radnor, Pa.; Alfa Aesar of Wardh hill, Mass. and Fischer Scientific of Hampton, N.H. Other suitable catalysts include acids and bases such as para-toluenesulfonic acid, phosphoric acid, which is available from Ricca Chemical of Arlington, Tex., sulfuric acid (Ricca Chemical) and alkali metal hydroxides (Sigma-Aldrich, VWR, Alfa Aesar); organometallic and metallic catalysts such as dibutyl tin dilaurate (which is available from Dura Chemicals Inc, of Emeryville, Calif. or OMG Americas Inc of Franklin, Pa.), tetra isopropyl titanate, cobalts and zirconiums (Sigma Aldrich, VWR, Alfa Aesar, Fischer Scientific). The percentage of catalyst added can vary from 0.01% up to 5.00% of the total formula weight.

There is no preferred polyisocyanate as any polyisocyanate trimer or a mixture of trimers can be reacted with the hydrolyzed silicone intermediate. Stability testing should be performed to determine the suitability of the chosen polyisocyanate(s). Applicable polyisocyanates include: Desmodur N3390 BA a hexamethylene diisocyanate (HDI) based polyisocyanate (NCO content 19.6±0.3%) (Bayer AG of Leverkusen, Germany), other isocyanate trimers and adducts including those based on isophorone diisocyanate (IPDI), diphenylmethane diisocyanate (MDI) and toluene diisocyanate (TDI) chemistry can be used. While the use of diisocyanates such as TDI, MDI, HDI, IPDI, and 4,4-dicyclohexylmethane diisocyanate ($H_{12}MDI$) can be applicable to this invention, polyisocyanates containing three or more isocyanate groups are preferred. Other suitable polyisocyanates include those of the Desmodur series from Bayer AG (all NCO content values are approximate): N 75 BA (NCO 16.5%); N 100 (22.0%); N 75 MPA/X (16.5%); N 75 MPA (16.5%); N 75 BA (16.5%); N 3200 (23.0%); N 3300 (21.8%); N 3390 BA/SN (19.6%); N 3600 (23.0%); N 3790 BA (17.8%); N 3800 (11.0%); N 3900 (23.5%); XP 2580 (20.0%) XP 2675 (20.0%); N 3400 (21.8%); XP 2730 (22.7%); XP 2679 (15.4%); Z 4470 SN (11.9%); Z 4470 MPA/X (11.9); Z 4470 BA (11.9%); XP 2489 (21.0%) and NZ 1 (20.0%). Also, one can utilize the following polyisocyanates from the Vestanat series from Evonik Industries AG of Essen, Germany (all NCO content values are approximate): T 1890 E (12.0%); T 1890 L (12.0%); T 1890 M (12.0%); T 1890 SV (12.0%); T 1890/100 (17.3%); HB 2640 E (16.5%); HB 2640 MX (16.5%); HB 2640/100 (22.0%); HB 2640 LV (23.0%); HT 2500 E (19.6%); HT 2500 L (19.6%); HT 2500/100 (21.8%); and HT 2500 LV (23.0%).

Preferably, the isocyanate-terminated polysiloxane is reacted with a hydroxylated resin or polyol with an OH value of 60-170 or an OH equivalent weight of 330-940. The hardener can react with any isocyanate-reactive species including, but not limited to, diols and polyols, amines, disubstituted ureas, urethanes, carboxylic acids, imino groups, carbonamide groups, sulfhydryls, sulfonamide groups, thioamide groups and sulphonic acid groups.

The invention can be further understood by means of the following examples, which are provided to illustrate but not limit the invention.

EXAMPLE 1

A 1000-mL round bottom reaction flask was equipped with a heating mantle, stirrer, a Dean-Stark trap, condenser and nitrogen purge. To the flask, 345.9 g (1.57 mol) SY 231, which is a methoxy-functional methyl phenyl polysiloxane intermediate, was added. To the intermediate was added 1.7 g of a hydrolyzation catalyst, namely tetra isopropyl titanate (which is 0.5% based on the weight of the silicone intermediate), under agitation and a nitrogen atmosphere as the catalyst is extremely air-sensitive. Following the addition of catalyst, 5.58 g (0.31 mol) water was added dropwise. Upon addition of water, the mixture turned hazy. The mixture was heated to 150° F. and then ramped up 10° F. every 10-15 min to a final temperature of 210° F. The mixture was held at this temperature until the predetermined amount of methanol (9.92 g, 0.31 mol) was collected. The distillate was analyzed by gas chromatography (GC). The GC spectrum may reveal the presence of small amounts of low molecular weight volatile materials. The mixture turned clear again after all the water had reacted. After the methanol was collected, the mixture was cooled down to 150° F. and a polyisocyanate, specifically Desmodur N 3390 BA, (656.7 g, 2.92 mol) was added under agitation at which point the mixture turned hazy again. The reaction was held at 150° F. for about an hour and then the NCO content of the mixture was checked via titration. The reaction was held for another half hour and the NCO content was checked again. This series of checks was repeated until a percent difference of less than 2% was obtained between readings. The mixture was poured off into a quart-sized can and capped with nitrogen. Product yield is estimated as at least 97%. The final product was characterized by Fourier transform infrared spectroscopy (FTIR).

The resulting product has the following structure:

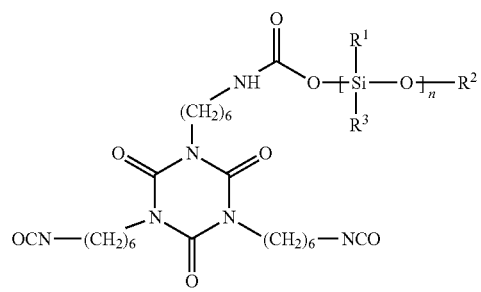

Figure 2:
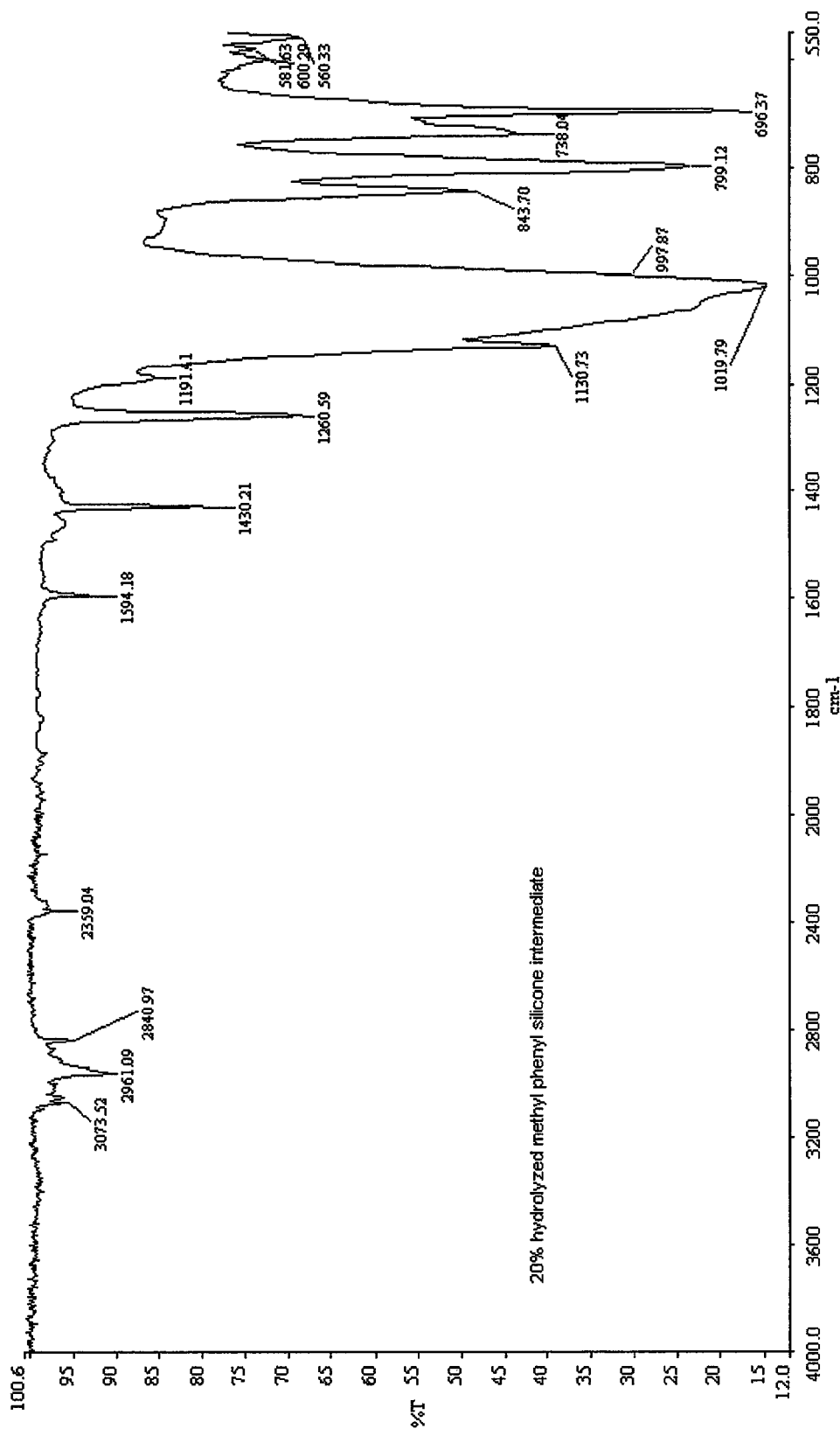
FIG. 2 is a graph of a FTIR analysis of a 20% hydrolyzed methyl phenyl polysiloxane intermediate resin from Example 1 showing the percent transmittance on the ordinate axis and the wavelength in $cm^{-1}$ on the abscissa axis.
Figure 3:
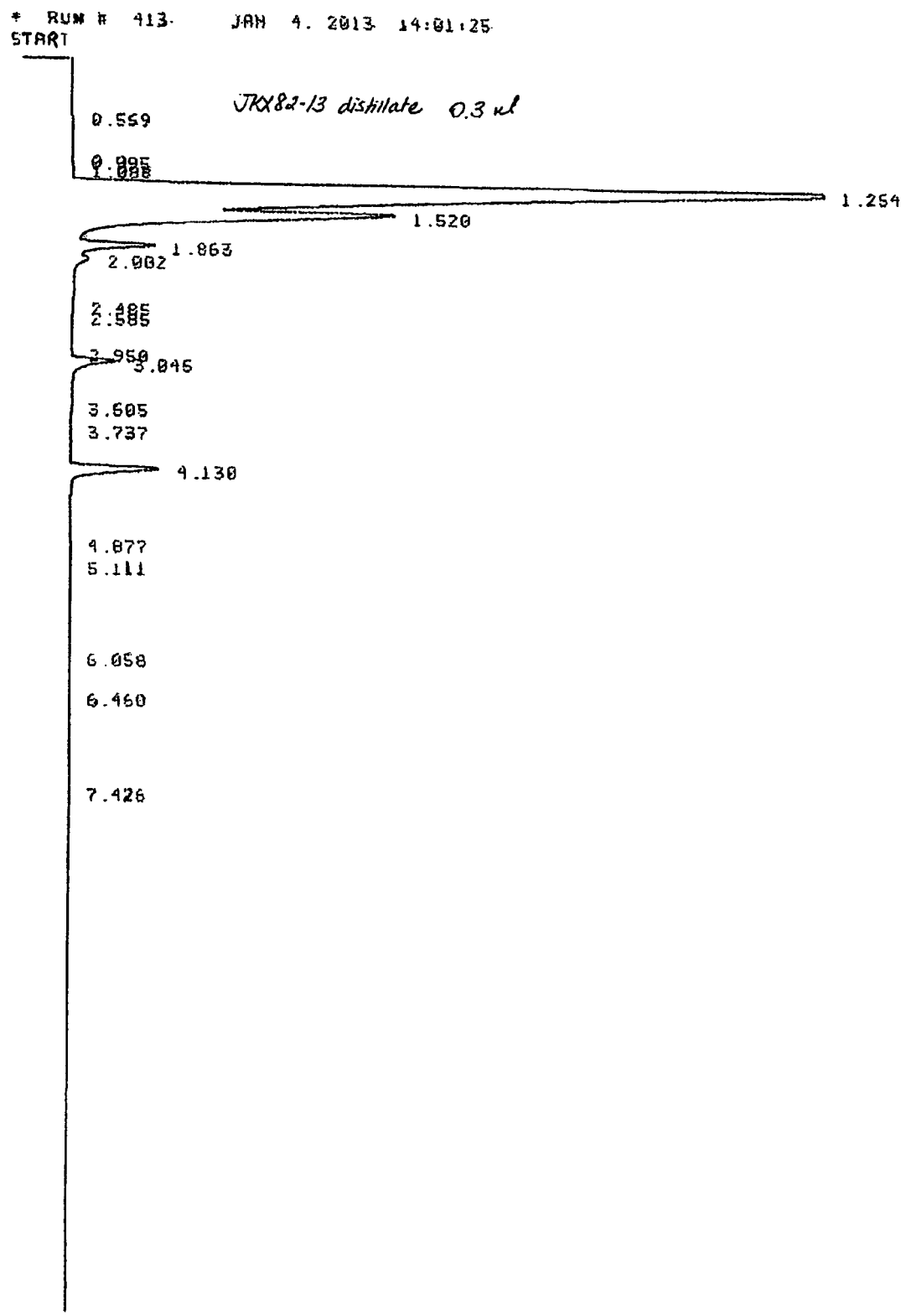
FIG. 3 is a graph of a GC analysis of the distillate from the hydrolysis reaction of a methyl phenyl silicone intermediate from Example 1.
Figure 4:
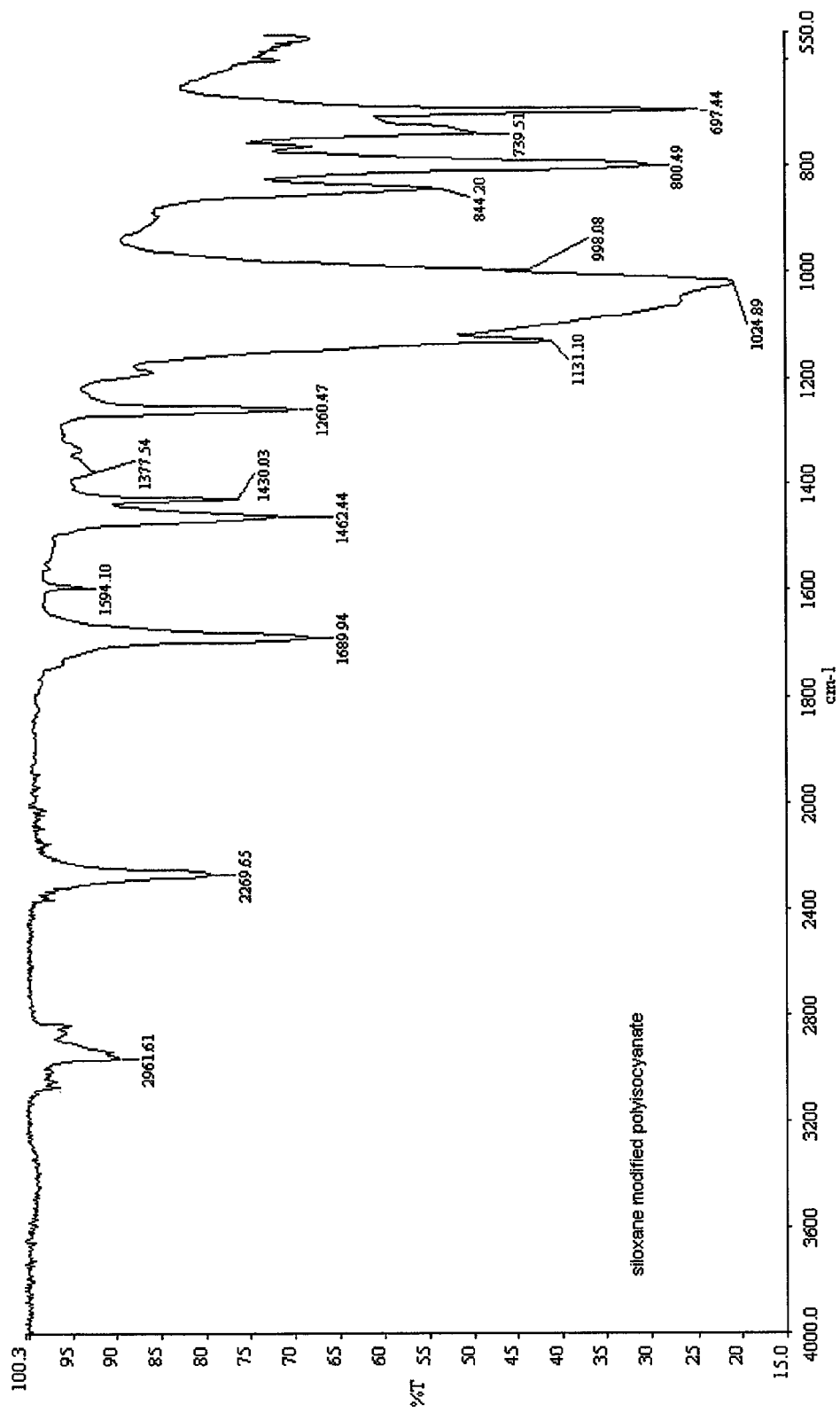
FIG. 4 is a graph of a FTIR analysis of an isocyanate-terminated polysiloxane hardener of Example 1 showing the percent transmittance on the ordinate axis and the wavelength in $cm^{-1}$ on the abscissa axis.
Figure 5:
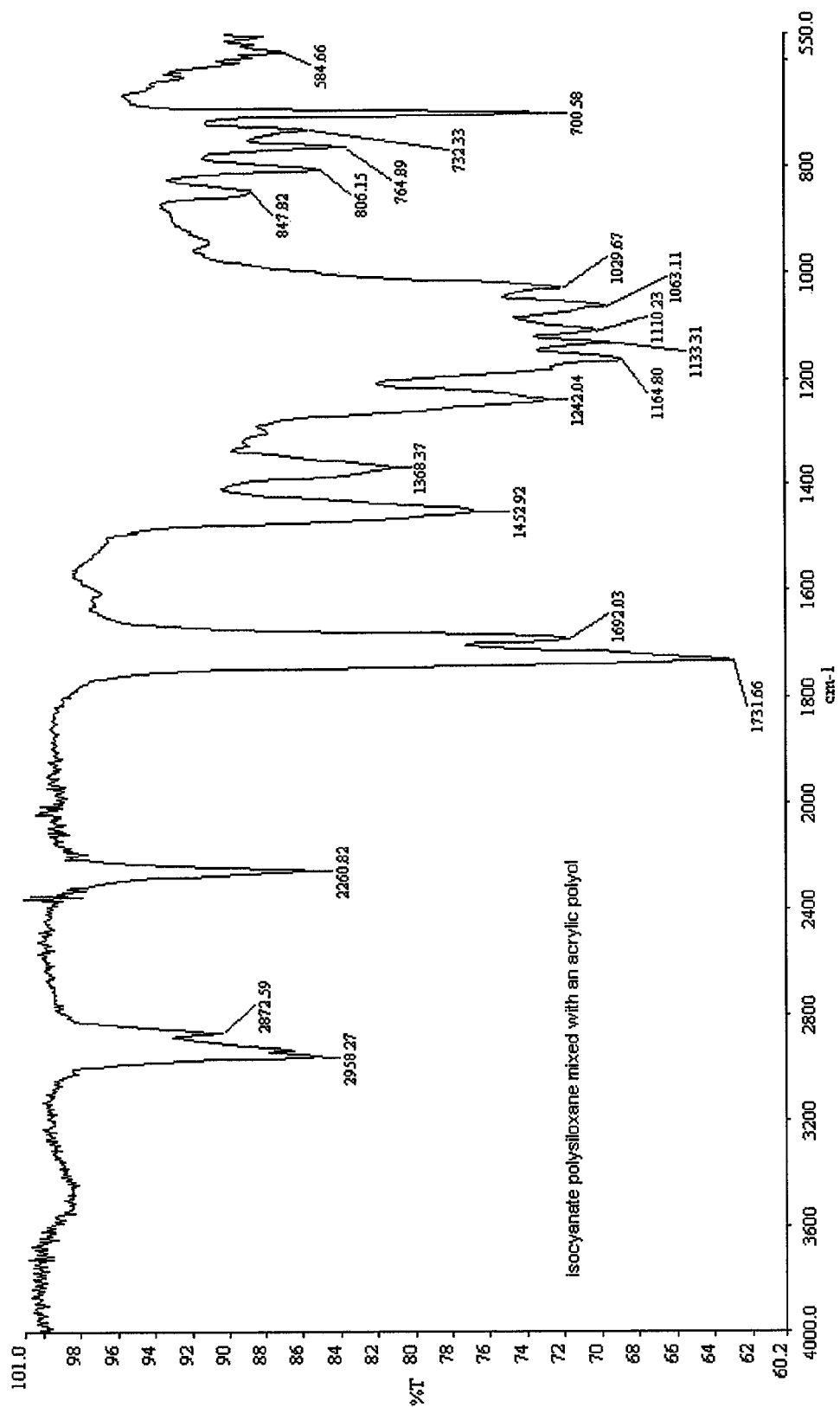
FIG. 5 is a graph of a FTIR analysis of the isocyanate-terminated polysiloxane hardener of Example 1 mixed with an acrylic polyester polyol showing the percent transmittance on the ordinate axis and the wavelength in $cm^{-1}$ on the abscissa axis.

FIGS. 1 and 2 show the FTIR spectrum of the unaltered SY 231 methoxy-functional methyl phenyl polysiloxane intermediate and the 20% hydrolyzed SY 231, respectively. FIG. 1 shows a methoxy functional (corresponding to strong absorptions at 2840 and 1191 $cm^{-1}$) methyl (corresponding to strong absorptions at 1259 $cm^{-1}$ and 750-870 $cm^{-1}$ range) phenyl (corresponding to the medium absorptions at 1594 and 1430 $cm^{-1}$) silicone resin. The reduction of the peak at 1191 $cm^{-1}$ (corresponding to the hydrolysable groups attached to the silicon backbone) and consequently, the appearance of a broad peak at approximately 3300 $cm^{-1}$ signified that the conversion of methoxy to hydroxy functionality was successful. The broad band between 1000-1135 $cm^{-1}$ corresponds to the Si—O—Si backbone. FIG. 3 shows the GC chromatograph for the distillate resulting from the hydrolysis of SY 231 which evidences that methanol is a byproduct of the reaction. There is also the presence of other low molecular weight volatile compounds. FIG. 4 shows the FTIR spectrum of the resulting isocyanate-terminated polysiloxane hardener.

The reaction between NCO and OH groups can occur under ambient conditions so it is not necessary, though it is preferred, to mix the hydrolyzed silicone intermediate and the polyisocyanate at higher temperatures to speed up the reaction. The theoretical NCO content of the isocyanate polysiloxane prepolymer formed in the above reaction scheme is approximately 12.2±0.5% (NCO average equivalent weight 330-360.) Other typical values of the preferred isocyanate polysiloxane hardener are outlined in the following table:

TABLE 1

| Property | Value |
| --- | --- |
| Solids | ≥90.0% |
| NCO Content | 12.0 ± 0.5% |
| Moisture Content | 0.0-0.12% |
| Weight per Gallon | 9.40-9.60 |
| Haze | Very hazy |
| Color (BYK Gardner) | 0-1 |
| Brookfield Viscosity (spindle 4, 20 rpms) | 1500-2500 cps |

These property values, however, are dependent on the polyisocyanate used.

EXAMPLE 2

The procedure of Example 1 was repeated except that Desmodur N3600 was used instead of Desmodur N 3390 BA.

Product yield is estimated as at least 75%. Desmodur N3600 is the solvent-free version of Desmodur N 3390 BA. The resulting product has the same structure as shown in Example 1.

EXAMPLE 3

The procedure of Example 1 was repeated except that Vestanat T 1890 L was used instead of Desmodur N 3390 BA. Using this IPDI trimer produced a clear hardener. Product yield is estimated as at least 90%. The resulting product has the following structure:

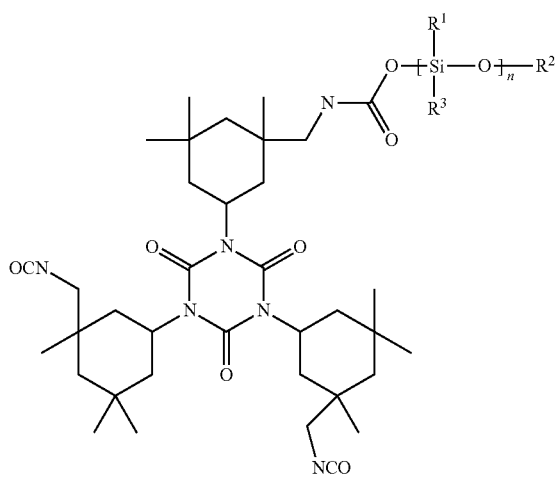

EXAMPLE 4

The procedure of Example 1 was repeated except that Vestanat T 1890 L (44% by total weight) and methyl amyl ketone (1% by total weight) was post-added to the example in 1 (55% by total weight) and blended together. Product yield is estimated as at least 97%.

EXAMPLE 5

The isocyanate-terminated polysiloxane hardener of Example 1 was mixed with an acrylic polyester polyol with an equivalent weight of approximately 600-700 so that the ratio of polyol to hardener is 2:1. The isocyanate-terminated polysiloxane hardener of Example 1 can be blended with other isocyanate trimers such as Desmodur Z4470 SN/BA, an IPDI trimer. The addition of another trimer will consequently alter the percent NCO of the hardener and therefore the affect the polyol to hardener ratio. The hardener can also be thinned down with solvents, although alcohols and water-containing solvents are not preferred as they cause undesirable side effects. The appropriate type of solvent used is dependent upon the polyisocyanate(s) and stability testing should be conducted with the particular solvent or solvent mixtures used.

A red and a white acrylic coating were trialed using the isocyanate polysiloxane hardener of Example 1. The coatings were sprayed directly (i.e. no primer) onto steel bonderite panels (that were previously washed with acetone to remove any oils). The panels were left to dry under ambient conditions for one week and then were subjected to accelerated testing in the QUV weathering chamber (340-A lamps), Cleveland humidity chamber and salt spray chamber. The panels were monitored for changes in gloss, lightness and blistering for a period of least 3,000 hours.

Figure 6:
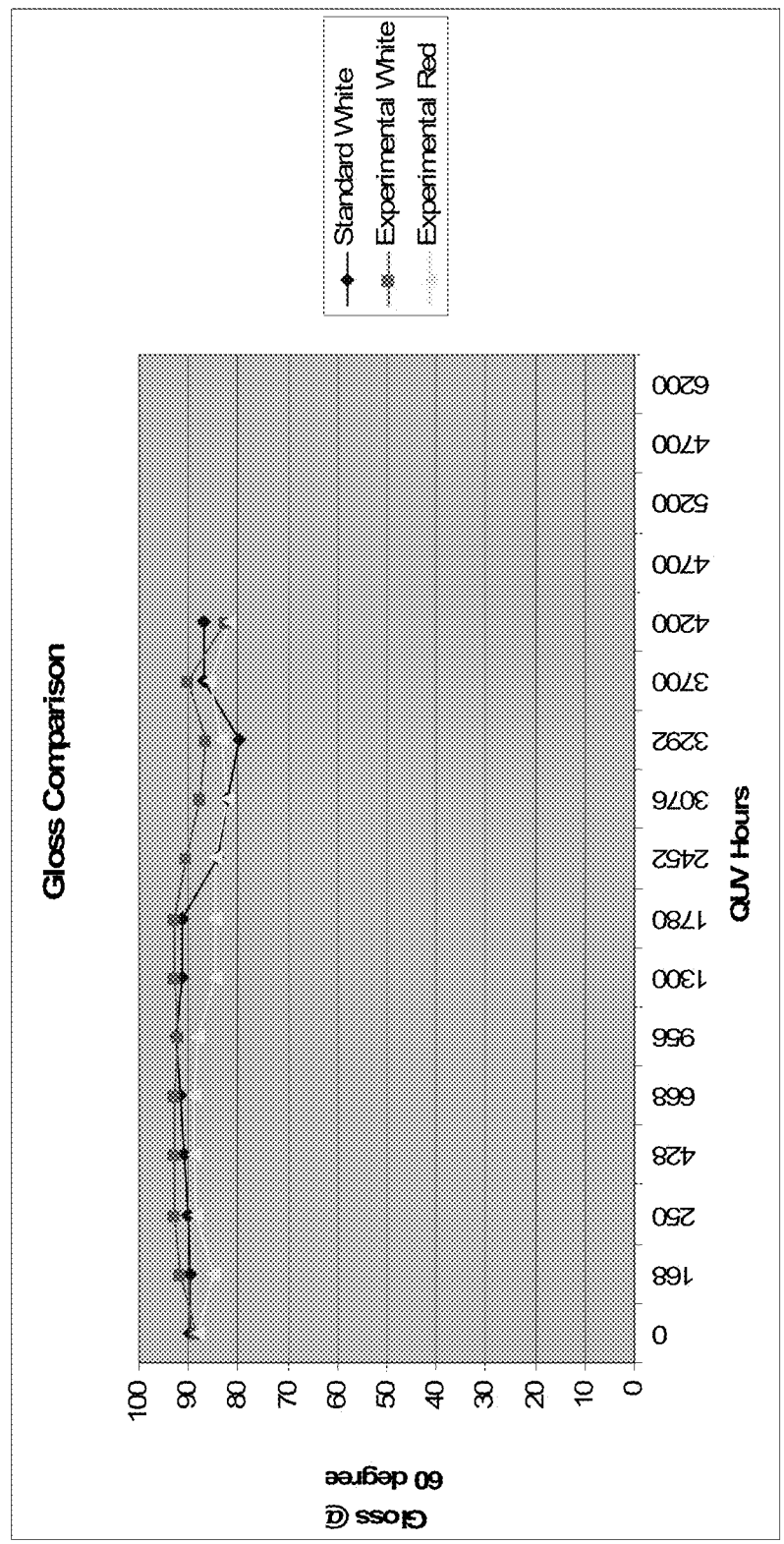
FIG. 6 is a graph comparing the gloss of a standard white acrylic polyester coating versus white and red acrylic polyester polysiloxane coating according to the invention showing the gloss in percent at sixty degrees on the ordinate axis and time in hours on the abscissa axis.

FIG. 6 is a graph above that compares the gloss of the standard white acrylic polyester coating to white and red acrylic polyester coatings using an isocyanate polysiloxane of the current invention as prepared in Example 5, which are labeled as JKX81-6 and JKXZ81-18 respectively. As can be seen in FIG. 6, the percent gloss retention of the acrylic polyester polysiloxane coating is comparable to the standard coating. Both white samples show a significant gloss decrease after 2400 hrs. The red acrylic polyester polysiloxane coating shows a gloss decrease after 950 hours but has maintained a steadier delta gloss value compared to the standard white coating.

The panels prepared according to Example 5, along with a panel similarly prepared using a conventional white acrylic polyester coating, were measured using BYK Spectro-Guide colorimeter with software CyberChrome OnColor. In particular, the panels were observed for changes in lightness or darkness (represented by "DL*" where a +DL is lighter than a standard measurement and a −DL is darker than a standard measurement); changes in red shade or green shade (represented by "Da*" where +Da* is a red shade and −Da* is a green shade); changes in yellow shade or blue shade (represented by "Db*" where +Db* is a yellow shade and −Db* is a blue shade) and changes in DE* which is represented by the formula: $[(DL*)2+(Da*)2+(Db*)2]^{1/2}$.

Figure 7:
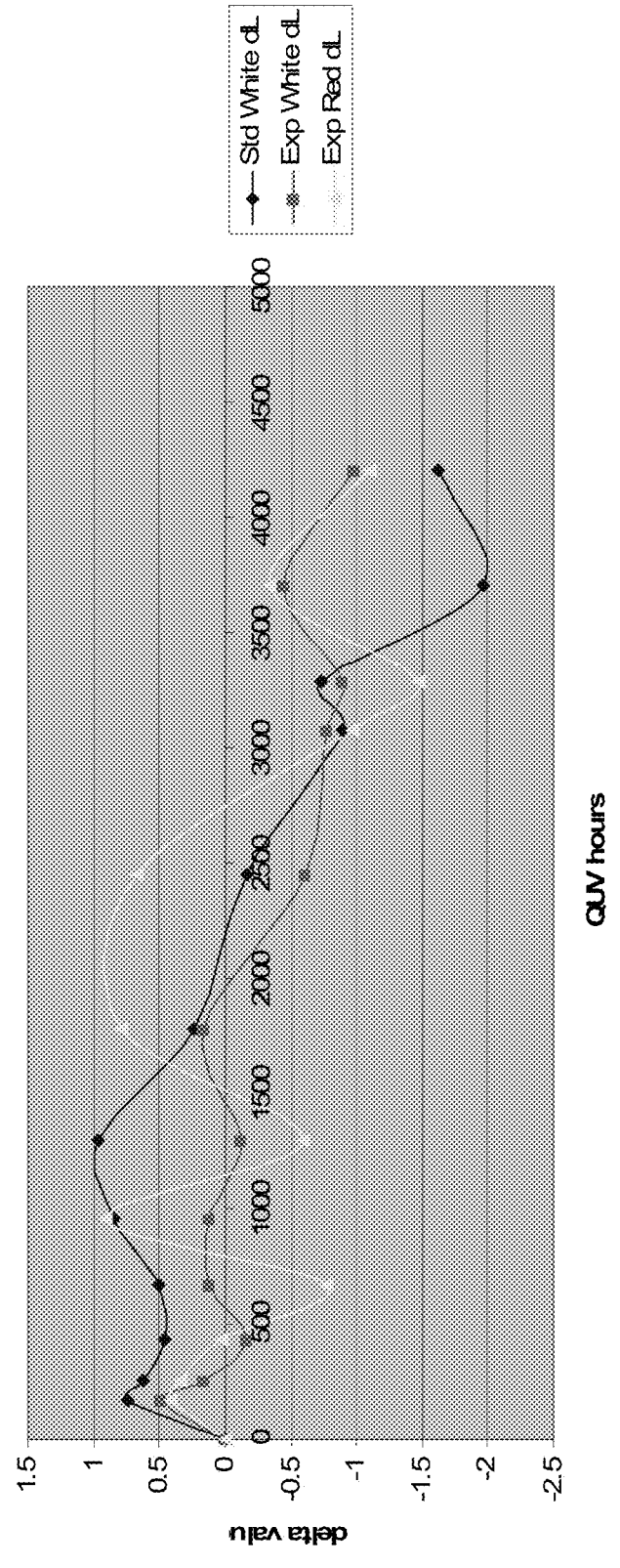
FIG. 7 is a graph comparing the DL and DE values of the standard white acrylic polyester coating versus white and red acrylic polyester polysiloxane coating according to the invention showing the DL and DE values on the ordinate axis and time in hours on the abscissa axis.
Figure 8:
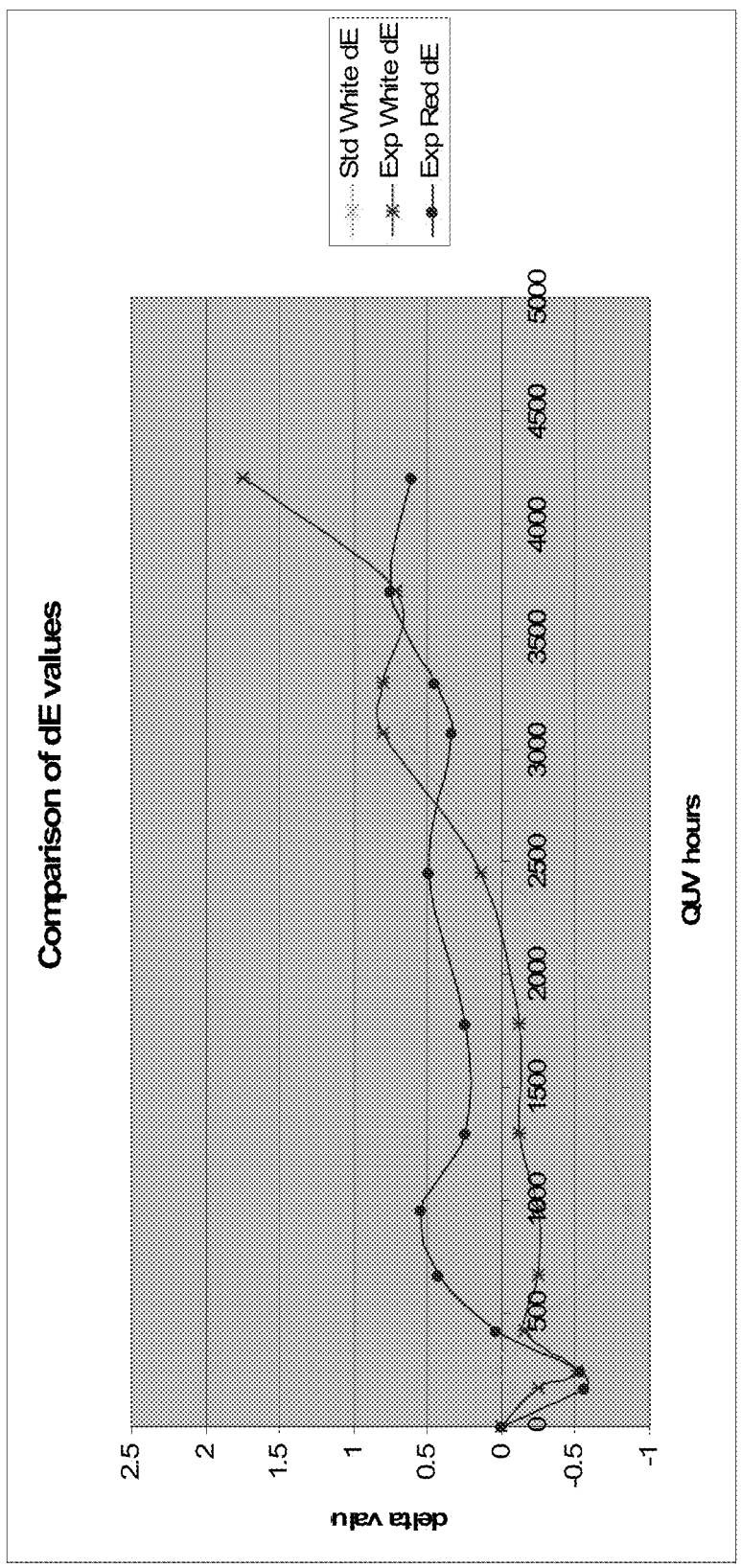
FIG. 8 is a graph comparing the DE values of the standard white acrylic polyester coating versus white and red acrylic polyester polysiloxane coating according to the invention showing the DE values on the ordinate axis and time in hours on the abscissa axis.

As can be seen in FIG. 7, the coatings that were cured using the isocyanate polysiloxane hardener of the current invention showed remarkably comparative DL and DE values to the standard white acrylic polyurethane formula over the period of 3,000 hours.

Under the humid conditions of the Cleveland chamber and the salt spray, the coatings also displayed great adhesion though some blistering was observed to occur starting after 500 hours, generally, and severe blistering started to occur generally around 3,000 hours.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. An isocyanate-terminated polysiloxane material comprising the following structure

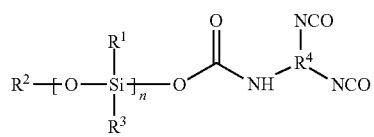

wherein n>1, $R_1$, $R_2$, and $R_3$ individually corresponds to a methyl, phenyl or alkyl group;

wherein $R_4$ is selected from the group consisting of cycloaliphatic groups, aromatic groups, and adducts based on hexamethylene diisocyanate (HDI), isophorone diisocyanate (IPDI), diphenylmethane diisocyanate (MDI) and toluene diisocyanate (TDI).

2. The polysiloxane material of claim 1 wherein the polysiloxane material comprises the following structure:

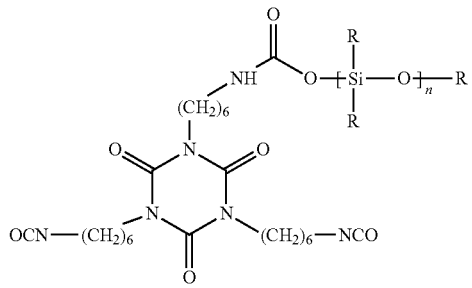

wherein n>1 and each R individually corresponds to a methyl, phenyl or alkyl group.

3. The material of claim 2 wherein each R is independently selected from the group consisting of methyl, phenyl, and mixtures thereof.

4. A method of manufacturing an isocyanate-terminated polysiloxane material comprising the steps of:
providing a silanol functional polysiloxane compound having the following structure:

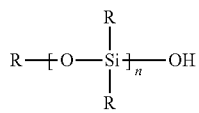

wherein n>1 and each R individually correspond to methyl, phenyl or alkyl groups;
providing an isocyanate having at least two isocyanate groups;
providing a reaction catalyst;
reacting the polysiloxane with the isocyanate in the presence of the catalyst for a period of time sufficient to produce a isocyanate-terminated polysiloxane material.

5. The method of claim 4 wherein the silanol functional polysiloxane is formed by:
providing a mexthoxy functional polysiloxane;
providing a hydrolyzation catalyst; and
at least partially hydrolyzing the methoxy groups on the mexthoxy functional polysiloxane.

6. The method of claim 5 wherein the hydrolyzation catalyst is the same as the reaction catalyst.

7. The method of claim 5 wherein the at least partially hydrolyzing step is carried out at a temperature of from about 130 to about 210° F.

8. The method of claim 5 wherein the hydrolyzing catalyst is from about 0.01 to about 5.00 percent by weight.

9. The method of claim 5 wherein the at least partially hydrolyzing step involves converting about 5 to about 80 percent of the methoxy groups on the methoxy functional polysiloxane to hydroxyl groups.

10. The method of claim 5 wherein the at least partial hyolyzation step is carried out under an inert atmosphere.

11. The method of claim 4 wherein the isocyanate is a polyisocyanate containing three or more isocyanate groups.

12. The method of claim 11 wherein the polyisocyanate has the following structure:

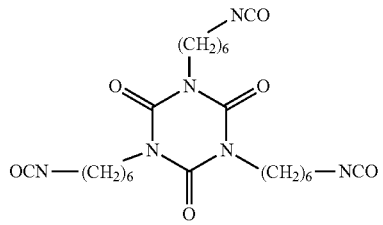

13. The method of claim 4 wherein the catalyst is selected from the group consisting of: tetra isopropyl titanate, para-toluenesulfonic acid, phosphoric acid, sulfuric acid, alkali metal hydroxides, organometallic catalyst, metallic catalysts, dibutyl tin dilaurate, tetra isopropyl titanate, cobalt, cobalt compounds, zirconium and zirconium compounds.

14. The method of claim 13 wherein the catalyst is tetra isopropyl titanate.

15. The method of claim 4 further comprising reacting the isocyanate-terminated polysiloxane material with an isocyanate-reactive material.

16. The method of claim 15 wherein the isocyanate-reactive material is selected from the group consisting of: diols, polyols, amines, disubstituted ureas, urethanes, carboxylic acids, imino groups, carbonamide groups, sulfhydryls, sulfonamide groups, thioamide groups, sulphonic acid groups and mixtures thereof.

17. The method of claim 16 wherein the isocyanate-reactive material is a hydroxylated resin or polyol with an OH value of from about 60 to 170.

18. The method of claim 16 wherein the isocyanate-reactive material is a hydroxylated resin or polyol with an OH equivalent weight of from about 330 to about 940.

19. The method of claim 16 wherein the ratio of the isocyanate-terminated polysiloxane material to the isocyanate-reactive material is about 1:2.

20. The method of claim 4 wherein the reacting the polysiloxane with the isocyanate step is carried out under an inert atmosphere.

21. The method of claim 4 wherein the reacting step is carried out at ambient temperature.

22. The method of claim 4 wherein the reacting step is carried out at about 150° F.

23. The method of claim 4 wherein the reaction catalyst is from about 0.01 to about 5.00 percent by weight.

24. A coating kit comprising:
an isocyanate-terminated polysiloxane curing agent;
an isocyanate-reactive polymer; and
wherein the isocyanate-terminated polysiloxane curing agent and the isocyanate-reactive polymer are packaged separately.

25. The coating kit of claim 24 wherein the isocyanate-reactive polymer is selected from the group consisting of: diols, polyols, amines, disubstituted ureas, urethanes, carboxylic acids, imino groups, carbonamide groups, sulfhydryls, sulfonamide groups, thioamide groups, sulphonic acid groups and mixtures thereof.

26. The coating kit of claim 24 wherein the isocyanate-reactive polymer is a hydroxylated resin or polyol with an OH value of from about 60 to 170.

27. The coating system of claim 24 wherein the isocyanate-reactive polymer is a hydroxylated resin or polyol with an OH equivalent weight of from about 330 to about 940.

28. The coating kit of claim 24 wherein the ratio of the isocyanate-terminated polysiloxane curing agent to the isocyanate-reactive polymer is about 1:2.

29. The coating kit of claim 24 wherein the isocynate-terminated polysiloxane curing agent comprises the following structure

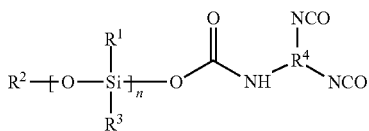

wherein n>1, $R_1$, $R_2$, and $R_3$ individually corresponds to a methyl, phenyl or alkyl group;

wherein $R_4$ is selected from the group consisting of cycloaliphatic groups, aromatic groups, and adducts based on hexamethylene diisocyanate (HDI), isophorone diisocyanate (IPDI), diphenylmethane diisocyanate (MDI) and toluene diisocyanate (TDI).

30. The coating kit of claim 29 wherein the isocyanate-terminated polysiloxane curing agent comprises the following structure:

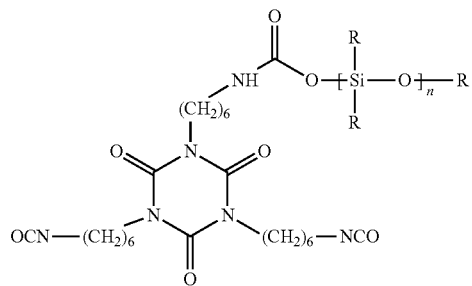

wherein n>1 and each R individually corresponds to a methyl, phenyl or alkyl group.

31. The material of claim 30 wherein each R is independently selected from the group consisting of methyl, phenyl, and mixtures thereof.

32. The coating kit of claim 29 wherein the isocyanate-reactive polymer is selected from the group consisting of: diols, polyols, amines, disubstituted ureas, urethanes, carboxylic acids, imino groups, carbonamide groups, sulfhydryls, sulfonamide groups, thioamide groups, sulphonic acid groups and mixtures thereof.

33. The coating kit of claim 29 wherein the isocyanate-reactive polymer is a hydroxylated resin or polyol with an OH value of from about 60 to 170.

34. The coating system of claim 29 wherein the isocyanate-reactive polymer is a hydroxylated resin or polyol with an OH equivalent weight of from about 330 to about 940.

35. The coating kit of claim 29 wherein the ratio of the isocyanate-terminated polysiloxane curing agent to the isocyanate-reactive polymer is about 1:2.

* * * * *